United States Patent
Derre et al.

[11] 3,812,338
[45] May 21, 1974

[54] ANALOG FUNCTION GENERATOR

[75] Inventors: Andre Derre, Valence; Jacques Jourdin, Granges-les-Valence, both of France

[73] Assignee: Crouzet, Paris, France

[22] Filed: July 27, 1972

[21] Appl. No.: 275,827

[30] Foreign Application Priority Data
July 29, 1971 France .......................... 71.28179

[52] U.S. Cl. .......................... 235/197, 235/150.2
[51] Int. Cl. .............................. G06g 7/22
[58] Field of Search . 235/197, 193, 150.26, 150.27, 235/150.272, 150.2, 151.34; 244/77; 35/10.2, 12

[56] References Cited
UNITED STATES PATENTS

| | | | |
|---|---|---|---|
| 2,886,244 | 5/1959 | Hunt | 235/197 |
| 2,938,280 | 5/1960 | Hunt | 235/197 X |
| 2,715,995 | 8/1955 | Wirkler | 235/150.27 |
| 2,775,124 | 12/1956 | Gardner et al. | 235/150.2 X |
| 3,028,090 | 4/1962 | Fogarty et al. | 235/150.2 X |
| 3,171,023 | 2/1965 | Des Hons | 235/197 |
| 3,435,197 | 3/1969 | Hooton | 235/197 |

*Primary Examiner*—Joseph F. Ruggiero
*Attorney, Agent, or Firm*—Holman & Stern

[57] ABSTRACT

An analog function generator which generates a function, such as a hyperbolic function or a function in the neighbourhood of a hyperbolic function, of an input variable furnished in the form of a voltage. The generator comprises two linear amplifiers giving from a reference voltage two voltages which are linear functions of the input variable. A potentiometer is provided which receives at each end respectively the output voltages of the linear amplifiers, the displacement of the slider of the potentiometer being controlled so that the voltage available at the slider is equal to zero. Means are also provided for measuring the relative displacement of the slider with respect to the potentiometer.

8 Claims, 1 Drawing Figure

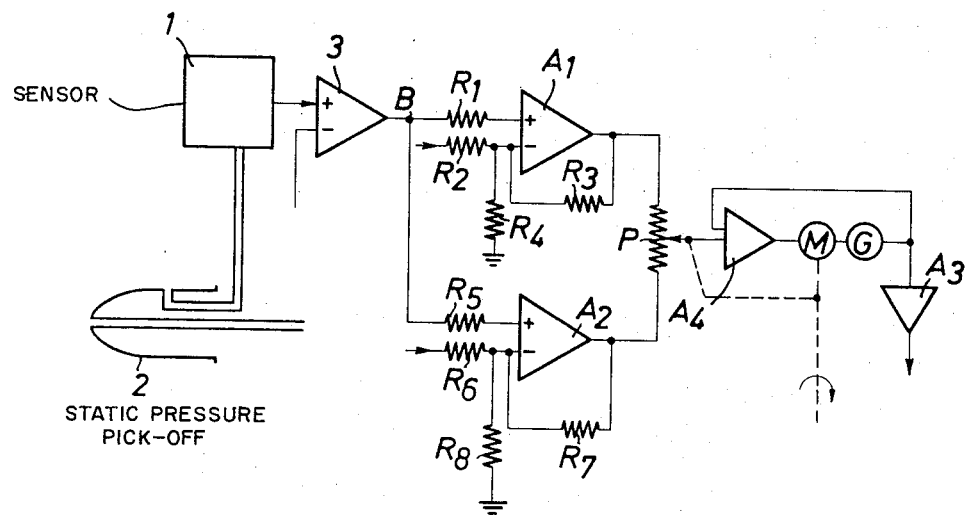

ANALOG FUNCTION GENERATOR

BACKGROUND OF THE INVENTION

The present invention relates to a device for calculating a hyperbolic function or a function in the neighbourhood of a hyperbolic function and is of particular utility in analog anemometric units for aircraft.

It is known that there are employed on modern aircraft, and in particular on supersonic aircraft, devices termed anemometric devices or pressure devices which receive data corresponding to the measurements carried out by various sensors: static, dynamic pressure, temperature, incidence, and which calculate from these data a large number of characteristic functions of operation of the aircraft, the principal functions being the altitude, the calibrated airspeed, and the mach number.

The results of these calculations are automatically furnished in appropriate form to various other devices in the aircraft with no intervention on the part of the pilot.

In addition to this automatic nature of the distribution of the results (about 30 outputs), these devices afford an advantage over conventional devices — such as the altimeter, indicator of calibrated airspeed and machmeter which, owing to their robust simplicity and their independence of electric circuits, remain as a safety measure on the aircraft — since they compensate for the errors of the sensors and the errors of the pressure pick-offs and furnish more precise results since these errors are themselves a function of certain of the calculated values: static pressure, mach number, etc. The functions for calculating these corrections are indicated by the constructor of the aircraft after having been determined experimentally in the course of tests of the prototype aircraft.

Up to the present time, the anemometric units were constituted mainly by electromechanical means.

This is the case in particular of the unit described in French Pat. No. 1,268,561.

In these known anemometric units, the mechanical means were controlled in such a manner as to move as a function of values furnished by the sensors. These mechanical means controlled other mechanical means by cams, the profiles of which represented the functions to be solved, the values of correction of the errors of the sensors being themselves worked out by other cams shifting mechanical means and the corrections being thereafter introduced by mechanical differential systems.

This resulted in a highly complex construction due to many mechanical interconnections, long response times due to the inertia of the mechanical means and a large overall size consuming a great amount of space.

In a case of an incident, or breakdown, the least intervention required the dismantling of many elements in order to gain access to the presumably faulty part. This dismantling put the apparatus out of adjustment which, upon reassembly, required a costly setting.

In the new analog anemometric units, the intention is to replace the electromechanical elements calculating functions by static electrical and electronic means as far as possible, which results in a more compact and smaller construction, since the electrical connections do not require, as do prior mechanical connections, a well-determined architecture. It is furthermore possible to contemplate a modular construction, that is to say, a construction in which each element is connected to the others by means capable of being dismantled, which makes it possible, in the case of an incident or breakdown, to separate from the assembly such and such element presumed to be faulty and to replace it by another element without destroying the setting or regulation of the unit.

It is certain that in the present state of the art of construction of components, a person skilled in the art is capable of overcoming all problems of the solving functions by electronic means, but the systems are often very complicated and result in large sizes incompatible with use on an aircraft.

In the analog anemometric units, the input magnitudes (static pressure and differential pressure or dynamic pressure) are measured by pressure sensors of the type furnishing a voltage which is proportional to the measured magnitude and certain of the physical magnitudes furnished by the unit in particular the altitude $H_p$ and the calibrated airspeed $V_c$ have laws of variation as a function of the static pressure and of the differential pressure respectively, which are very nearly hyperbolic functions.

SUMMARY OF THE INVENTION

It is therefore very useful to possess means for furnishing a hyperbolic function from an input voltage, these means being commonly termed a hyperbolic function generator.

An object of the invention is to provide such a generator which is simple in construction and cheap and to provide a modification in which the generated function is nearly a hyperbolic function.

The invention provides an analog function generator which generates a function, such as a hyperbolic function or a function in the neighbourhood of a hyperbolic function, of an input variable furnished in the form of a voltage, the generator comprising two linear amplifiers which provide from a reference voltage two voltages which are linear functions of the input variable, a potentiometer receiving at each of its ends respectively the output voltages of the linear amplifiers, the displacement of the slider of the potentiometer being controlled so that the voltage available at the slider is equal to zero, and means for measuring the relative displacement of the slider with respect to the potentiometer.

In the case of a purely hyperbolic function, the potentiometer is linear. In the case of a function in the neighbourhood of a hyperbolic function, the potentiometer is functional and has a law difference with respect to a linear potentiometer which is the difference between the function and the hyperbolic function to which it closely relates.

The means for controlling the slider of the potentiometer can be constituted by an amplifier, a servomotor and a negative-feedback generator.

The potentiometer may be of the rotary type.

BRIEF DESCRIPTION OF THE DRAWING

There will now be described in detail, by way of example with reference to the accompanying drawing, the means for calculating in a particularly simple manner in accordance with the invention the altitude $H_p$ of an aircraft as a function of the static pressure $P_s$, the single FIGURE of the drawing representing very diagrammatically the means for calculating the altitude $H_p$.

DETAILED DESCRIPTION OF THE PREFERRED EMBODIMENT

Calulation of the altitude $H_p$ as a function of the static pressure $P_s$:

The altitude $H_p$ is calculated from the law of the standard atmosphere:

$$H_p = f_1(P_s)$$

In the range of altitude contemplated for the aircraft, this law is nearly a hyperbolic function:

$$Y_1 = (K_1 P_s + K_2)/(K_3 P_s + K_4) \quad (1)$$

$K_1, K_2, K_3$ and $K_4$ being constants.

Whence:

$$f_1(P_2) - Y_1 = g_1(H_p)$$

in which $g_1(H_p)$ is the correction, function of the altitude $H_p$, which must be added to $Y_1$ to obtain $H_p$.

A sensor 1 of known type providing a d.c. voltage proportional to the pressure it receives from an antenna or static pressure pick-off 2, delivers a voltage proportional to the local pressure $P_{si}$ which is the sum of the true static pressure $P_s$ and a pressure error $dP_s$ which is the function of the mach number, the incidence and $P_s$.

The analog unit calculates in a known manner the value $dP_s$ and delivers a d.c. voltage proportional to $dP_s$.

These two voltages $P_{si}$ and $dP_s$ are added in an adding amplifier 3 which delivers a voltage $P_s = P_{si} - dP_s$ at terminal B.

According to the invention, the voltage $P_s$ and a reference voltage $V_0$ are applied to a linear amplifier $A_1$, associated with resistors R1, R2, R3, R4, to give a voltage, $$V_1 = aP_s + b$$

and to a second linear amplifier A2, associated with resistors R5, R6, R7, R8, to give a voltage:

$$V_2 = cP_s + d$$

the constants $a, b, c$, and $d$, depending on the characteristics of the circuit.

The two ends of a rotary linear potentiometer P are supplied with these two voltages $V_1$ and $V_2$.

The voltage $v$ of the slider of the potentiometer P is, depending on its position $x$ and knowing that its total travel is $X$:

$$v = (aP_s + b - cP_s - d) x/X + cP_s + d$$

In controlling the slider by means of an amplifier $A_4$ and a motor M associated with a generator G so that $v = 0$ there is obtained:

$$x = (cP_s + d)/[(c-a)P_s + d-b]X$$

by identifying with equation (1) there is obtained:

$x = Y_1$
$cx = K_1$
$dx = K_2$
$c - a = K_3$
$d - b = K_4$

The displacement $x$ of the slider, that is, the angle of rotation of the potentiometer, is a hyperbolic function of $P_s$.

In choosing as potentiometer P a functional potentiometer whose law difference with respect to a linear potentiometer is the known function $g_1(H_p)$, the rotation of the slider is:

$$(cP_s + d)/[(c-a)P_s + d - b]X + g_1(H_p) = H_p$$

The rotation $H_p$ of the potentiometer is expressed in feet of altitude and $X$ is the altitude range in feet contemplated for the apparatus.

An interesting feature is that the voltage given by the generator G (this generator being in any case necessary for the negative-feedback of the control) is:

$$dH_p/dt$$

that is to say, it is proportional to the vertical component of the speed of the aircraft. This voltage, amplified by an amplifier A3, is employed as result of the calculation of the vertical component of the speed of the aircraft.

For the calculation of the calibrated airspeed $V$ as a function of the differential pressure $Q_c$, which is the difference between the total pressure $P_t$ and the static pressure $P_s$, $V_c = f_2(Q_c)$ is determined by the following relation:

$$1 + (Q_c/P_{so}) = [1 + 0{,}2 (V_c^2/C_o^2)]^{3,5}$$

in which $P_{so}$ and $C_o$ are constants, namely respectively static pressure at zero altitude in standard atmosphere and the velocity of sound at a temperature of 15° C.

In the range of calibrated airspeed contemplated for the aircraft, this law is in the neighbourhood of a hyperbolic function:

$$Y_2 = (K'_1 Q_c + K'_2)/(K'_3 Q_c + K'_4) \quad (2)$$

Whence:

$$f_2(Q_c) - Y_2 = g_2(V_c)$$

in which $g_2(V_c)$ is the correction which is a function of the calibrated airspeed $V_c$ which must be added to $Y_2$ to obtain $V_c$.

A differential sensor of known type delivering a d.c. voltage proportional to the difference between the pressures it receives from a static pressure pick-off and from a total pressure pick-off of the Pitot tube, delivers a voltage proportional to the local differential pressure $Q_{ci}$ which is the sum of the true differential pressure $Q_c$ and a differential pressure error $dQ_c$ which is a function of the mach number, $Q_c$ and $P_s$.

The analog unit calculates in the known manner the value $dQ_c$ and delivers a d.c. voltage proportional to $dQ_c$.

These two voltages $Q_{ci}$ and $dQ_c$ are added in an adding amplifier which delivers a voltage $Q_c = Q_{ci} - dQ_c$ at terminal B.

According to the invention, the voltage $Q_c$ and a reference voltage $V_0$ are applied to the linear amplifier $A_1$ associated with the resistors R1, R2, R3, R4, to give a voltage:

$$V'_1 = a'Q_c + b'$$

and to a second linear amplifier $A_2$ associated with the resistors R5, R6, R7, R8, to give a voltage of:

$$V'_2 = c'Q_c + d',$$

$a', b', c', d'$ depending on the characteristics of the circuit.

The two ends of the linear potentiometer P are supplied with these two voltages $V'_1, V'_2$; the voltage $y'$ at the slider is, depending on its position $x'$ and knowing that its total travel is $X'$:

$$v' = (a'Q_c = b' - c'Q_c - d') x'/X' + c'Q_c + d'$$

In controlling the slider by means of an amplifier and a motor generator so that:

$$v' = 0, \text{ there is obtained:}$$

$$x' = (c' Q_c + d') / [(c'-a') Q_c + d'-b'] X'$$

By identifying with the equation (2), there is obtained:

$$x' = Y2$$
$$c'x' = K'1$$
$$d'x' = K'2$$
$$c'-a' = K'3$$
$$d'-b' = K'4$$

The displacement $x'$ of the slider, that is, the angle of rotation of the potentiometer P, is a hyperbolic function of $Q_c$.

In using as potentiometer P a functional potentiometer whose law difference with respect to a linear potentiometer is:

$$g_2 (Q_c)$$

the rotation of the slider is:

$$c'Q_c + d')/[(c'-a')Q_c + d'-b']X' + g_2 (V_c) = V_c$$

The rotation $V_c$ of the potentiometer is expressed in knots and $X'$ is the range of calibrated airspeed in knots contemplated for the apparatus.

The invention is therefore particularly applicable to analog anemometric units for aircraft.

What we claim is:

1. An analog function generator which generates a function, such as a hyperbolic-like function, of an input variable furnished in the form of a voltage, said generator comprising: two linear amplifiers generating from a reference voltage two voltages which are linear functions of said input variable; a potentiometer having a displacable slider and receiving at each end respectively said output voltages of said linear amplifiers; controlling means for controlling the displacement of said slider of said potentiometer so that the voltage available at said slider is equal to zero, and means for measuring the relative displacement of said slider with respect to said potentiometer.

2. A generator as claimed in claim 1, wherein in when a purely hyperbolic like function is generated, said potentiometer is linear.

3. A generator as claimed in claim 1, wherein in when a function vicinal to a hyperbolic-like function is generated, said potentiometer is functional and its function differs from that of a linear potentiometer by the difference between the real function and the hyperbolic-like function to which it closely relates.

4. A generator as claimed in claim 1, wherein said controlling means for controlling said slider of said potentiometer comprises an amplifier, a servomotor and a negative-feedback generator.

5. A generator as claimed in claim 1 in which said potentiometer is a rotary potentiometer.

6. A generator as claimed in claim 4, wherein a further amplifier is disposed at the terminals of the negative-feedback generator.

7. A device for measuring the altitude of an aircraft, comprising a generator as claimed in claim 1, in which said input voltage is proportional to the static pressure.

8. A device for measuring the calibrated airspeed of an aircraft, comprising a generator as claimed in claim 1, in which said input voltage is proportional to the dynamic pressure.

* * * * *